United States Patent
Huang et al.

(10) Patent No.: US 7,332,325 B2
(45) Date of Patent: Feb. 19, 2008

(54) BIOLOGICAL METHOD FOR REMOVING ORGANIC POLYMERS

(75) Inventors: Shir-Ly Huang, Jungli (TW); Dy-Hwa Tseng, Jungli (TW); His-Jien Chen, Jungli (TW)

(73) Assignee: National Central University, Taoyuan (TW)

( * ) Notice: Subject to any disclaimer, the term of this patent is extended or adjusted under 35 U.S.C. 154(b) by 385 days.

(21) Appl. No.: 10/979,076

(22) Filed: Oct. 29, 2004

(65) Prior Publication Data

US 2005/0095694 A1 May 5, 2005

(30) Foreign Application Priority Data

Oct. 31, 2003 (TW) ............................... 92130410 A

(51) Int. Cl.
*B09B 3/00* (2006.01)
*C12N 1/00* (2006.01)
*C12N 1/20* (2006.01)

(52) U.S. Cl. ..................................... 435/262.5; 435/874

(58) Field of Classification Search ..................... None
See application file for complete search history.

(56) References Cited

U.S. PATENT DOCUMENTS 7,115,411 B2 * 10/2006 Huang ..................... 435/253.3

OTHER PUBLICATIONS

Tanghe et al, App and Env Micr. Feb. 1999, vol. 65 #2 pp. 746-751.*
Izuka et al, J. of Gen. App. Microb. 1964, vol. 10, #3, pp. 207-221.*
Maki et al, App and Env. Microb, Jul. 1994, vol. 60, #7, pp. 2265-2271.*
Sato et al, Polymer Degrad and Stability, 2001, vol. 74, pp. 69-75.*

* cited by examiner

*Primary Examiner*—David M. Naff
*Assistant Examiner*—Deborah K. Ware
(74) *Attorney, Agent, or Firm*—J.C. Patents

(57) ABSTRACT

A biological method for removing organic polymers is provided. The method includes the cultivation of a bacterial strain *Pseudomonas nitroreducens* TX1. The deposit numbers are PTA-6168 at ATCC and BCRC910228 at Bioresources Collection and Research Center in Taiwan (Republic of China). A nitrogen source and inorganic salts are required for bacterial growth. Moreover, the method also provides the information of the supply of air and the water content in soils when this invention is applied to the removal of organic polymers in soils. In addition, the viability of cultivated bacteria is not affected by endogenous bacteria in soils and able to maintain the capacity of degrading organic polymers in the method. The present invention is able to remove the organic polymers in a wide range of amounts effectively and useful in the bioremediation of contamination from organic polymers in both soils and water.

14 Claims, 3 Drawing Sheets

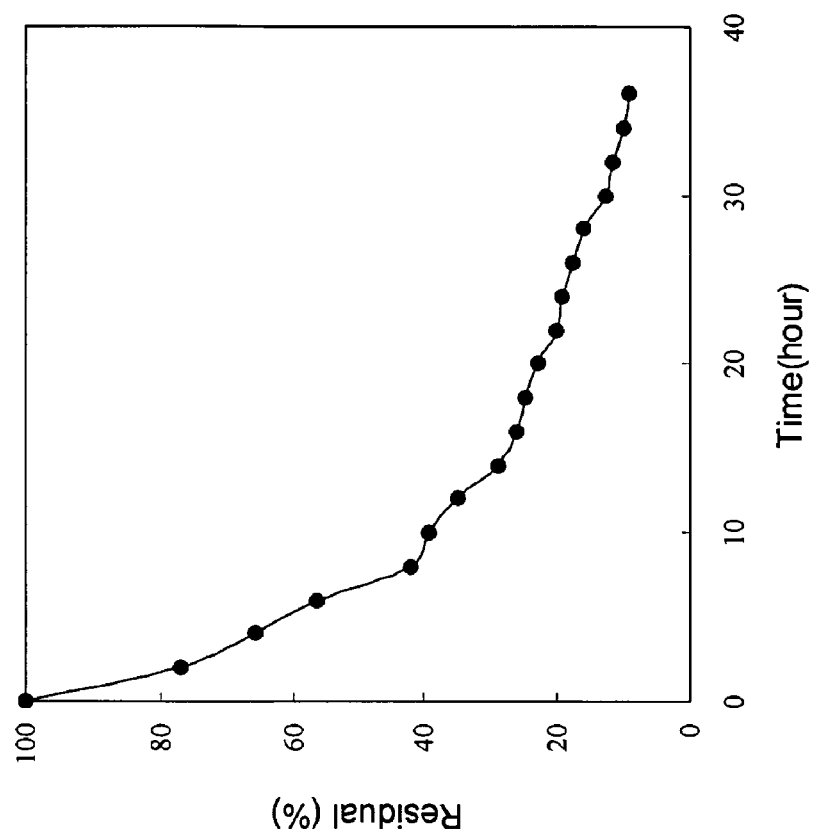

BIOLOGICAL METHOD FOR REMOVING ORGANIC POLYMERS

CROSS-REFERENCE TO RELATED APPLICATION

This application claims the priority benefit of Taiwan application serial no. 92130410, filed on Oct. 31, 2003.

BACKGROUND OF THE INVENTION

1. Field of the Invention

The present invention relates to a biological method. More particularly, the present invention relates to a biological method for removing organic polymers.

2. Description of Related Art

Organic polymers are extensively used in the agricultural, the manufacturing, the cosmetic and the medical industries. Nonionic surfactant is a typical type of organic polymers. About 25% of the nonionic surfactants are alkylphenol polyethoxylates ($APEO_n$) including nonylphenol polyethoxylates ($NPEO_n$) and octylphenol polyethoxylates ($OPEO_n$). Some of alkylphenol polyethoxylates and their metabolites were often accumulated in natural environment and have been considered as the environmental hormones. Therefore, the toxicity of them in ecology and human health caused by nonionic surfactants has gained a lot of attention in recent years.

Currently, due to the absence of legal regulation, organic polymers, for example, surfactants, used in many industries are often discharged along with the wastewater to the natural environment without further treatment. Further, many farmlands are sprayed with a large amount of pesticides or herbicides, which contaminate soils and water.

Additionally, in the bioremediation of petroleum and petrochemical contamination, organic polymers, such as surfactants are added to enhance the biodegradability of petrochemical contaminants. To prevent further contamination from such a bioremediation process, the removal of the residues of these organic polymers is crucial.

SUMMARY OF THE INVENTION

Accordingly, the present invention provides a biological method for removing organic polymers, wherein the organic polymers in soil, water or other environment are removed to solve the environmental pollution problems.

The present invention provides a biological method for removing organic polymers. The method provides the cultivation of a bacterial strain (*Pseudomonas nitroreducens* TX1) (the depository number is PTA-6168 at American Type Culture Collection, U.S.A and BCRC910228 at Bioresources Collection and Research Center, Food Industry Research and Development Institute of Republic of China (Taiwan)). The cultured bacterial strain is then dispersed into the soil, water or other environment that contains organic polymers. A nitrogen source and an inorganic nutrient salts are then supplied to the environment for the bacterial strain to degrade the organic polymers in the environment.

In one embodiment of the present invention, when the cultured bacteria is used to remove organic polymers in a soil environment, air is also supplied to the soil in addition to the nitrogen source and the inorganic nutrient salts. The water content of soil was maintained in the range of 30% to 60%. The bacterial strain added to the soil is about 0.05 to 1.5 times of the amount of the endogenous bacteria in the soil.

In another embodiment of the present invention, when the cultured bacterial strain is applied to remove organic polymers in water, air is optionally supplied to the water. Further, the removal rate of organic polymers in water is higher than that of organic polymers in a soil.

The method of the invention can be practically applied to the bioremediation process in soil, water or other environments to resolve the environmental pollution problems from organic polymers.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates the relationship between the amounts of organic polymers degraded by the bacterial strain of the invention in water with the increase of time.

DESCRIPTION OF THE PREFERRED EMBODIMENTS

The present invention provides a biological method for effectively removing organic polymers that are commonly used in domestic, industrial or agricultural activities to resolve environmental pollution related to the contamination of soil and water by organic polymers. The organic polymers, for example, alkylphenol polyethoxylates type of nonionic surfactant, are commonly used in the agricultural activities and chemical industries. The method of the invention is not only applicable in removing alkylphenol polyethoxylates type of nonionic surfactant. It is also applicable in removing other types of organic polymer compound that may cause environmental contamination. The applications of the method of this invention to soil and water are respectively discussed hereinafter. This invention may, however, be embodied in many different forms and should not be construed as limited to the embodiments set forth herein.

A bacterial strain (*Pseudomonas nitroreducens* TX1) is first cultured. This bacterial strain has been deposited to American Type Culture Collection (U.S.A) with the depository number PTA-6168 on Aug. 26, 2004 and Bioresources Collection and Research Center, Food Industry Research and Development Institute of Republic of China (Taiwan) with the depository number BCRC910228 on Aug. 6, 2003. The characteristics and the related information of *P. nitroreducens* TX1 are described in the U.S. patent application Ser. No. 10/875,006, filed on Jun. 22, 2004 by the same assignee. In one embodiment, the bacterial strain is cultured at a temperature between 15 and 40 degrees Celsius in aerobic condition with shaking. The generation time of *P. nitroreducens* TX1 is 0.5 to 2.0 hours. The culture medium contains for example, a MSB (mineral slats basal medium) containing alkylphenol polyethoxylates. Related information on MSB medium can be referred to R. Y. G. Stainer, C. Bazire and W. R. Sistrom, "Kinetics Studies of Pigment Synthesis by Nonsurlfur Purple Bacteria", in *J. Cell Comp. Physiol.*, 49: 25-28 (1966).

The cultured bacteria (*P. nitroreducens* TX1) are then dispersed into the soil or the water containing organic polymers. A nitrogen source and inorganic nutrient salts are supplied to these environments for the bacteria (*P. nitroreducens* TX1) to degrade the organic polymers. In one embodiment, degrading the organic polymers in the soil or the water is conducted at a temperature of 10 degrees Celsius to 40 degrees Celsius.

In one embodiment of the present invention, the organic polymers in the soil or the water include one or the groups of alkylphenol polyethoxylates, dodecyl octaethoxylate, polyethylene glycol, 1,4-dioxane, trioxane or cyclic ether.

Figure 1:
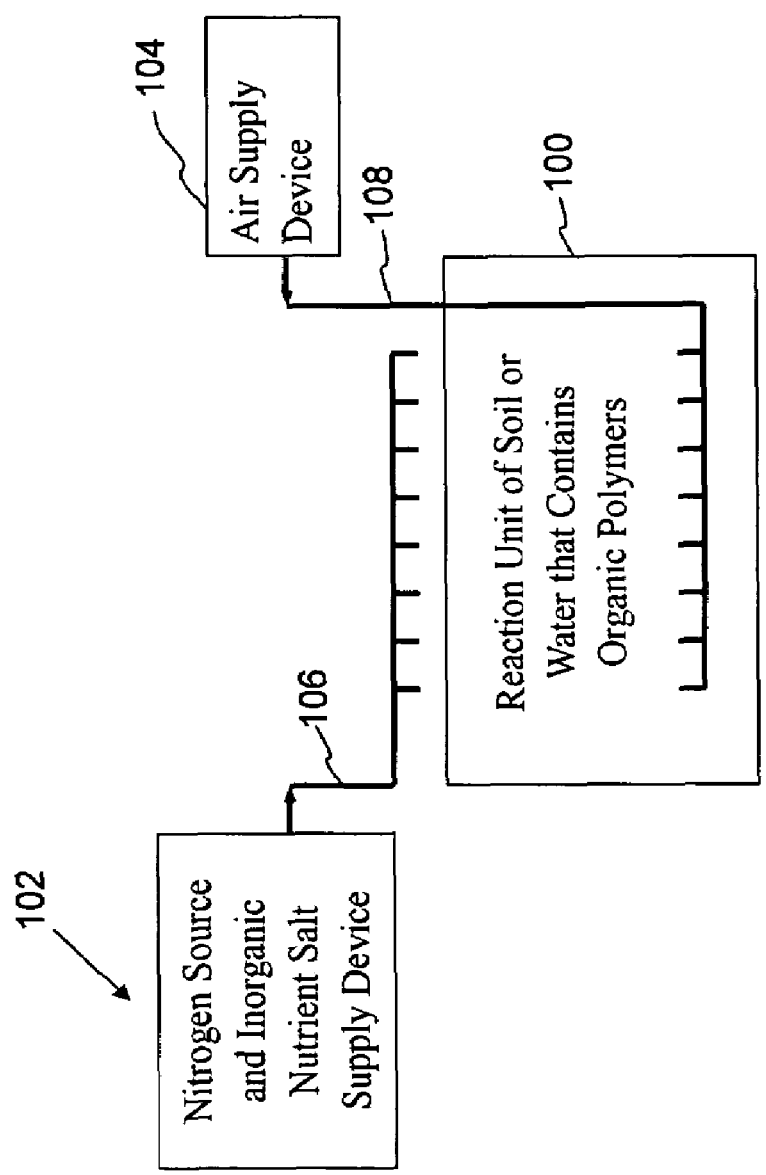
FIG. 1 is a schematic diagram illustrated a system used by the biological method for removing the organic polymers according to one embodiment of the present invention.

Furthermore, in addition to disperse the bacterial strain *P. nitroreducens* TX1 into the soil or the water that contains the organic polymers, a nitrogen source and inorganic nutrient salts are also supplied to these environment as shown in FIG. 1. Referring to FIG. 1, the reaction unit 100 of water, soil or other component that contains organic polymers was connected to the air supply device 104 and the nitrogen source and inorganic nutrient salt supply device 102 by tubing 106 and tubing 108, respectively. The reaction unit 100, besides containing wastewater, soil or other component that contains the organic polymers, also includes *P. nitroreducens* TX1. It is important to note that, the reaction unit 100 can be, but not limited to, a reaction tank, in which, the contaminated soil or wastewater is treated either manually or mechanically in batches. The reaction unit 100 can also be a specific region in a natural environment. It can be treated through the construction of the air supply device 104, the nitrogen source and inorganic nutrient salt supply device 102, the tubing 106 and the tube 108.

The treatment of soil and water will be discussed respectively to illustrate the present invention.

Still referring to FIG. 1, when the method of the present invention is applied to remove organic polymers in soil, it is first placed inside the reaction unit 100. The cultured bacteria *P. nitroreducens* TX1 of the present invention is then scattered into the soil in the reaction unit 100. In one embodiment, the water content of the soil in the reaction unit 100 is preferably maintained at 30% to 60%. If the water content in the soil is too low, adverse effects are obtained on the growth and the degradation capability of the bacterial strain *P. nitroreducens* TX1. Therefore, if the water content in the soil is not in an adequate range, a water-sprayed device (not shown) or other water-supplied method is used to provide water to the soil in order to obtain certain water content in the soil.

The nitrogen source and inorganic nutrient salt supply device 102 and a tubing 106 are used to supply a nitrogen source and inorganic salts to the soil in the reaction unit 100. In one embodiment of the invention, the supply device 102 mixes the solution of nitrogen source and the inorganic nutrient salts and delivered the solution to the soil through the tubing 106. The nitrogen source is ammonia or nitrate. To remove one gram of organic polymers, 0.1 to 0.5 gram of the nitrogen source is required. The inorganic salts are, for example, the MSB culture medium used previously to culture the bacterial strain. The MSB culture medium contains multiple types of inorganic salt. The amount of inorganic salts added is, for example, 100 to 400 ml for 1E8 to 1E10 of bacteria added. It is important to note that the soil is required to maintain certain water content to let the bacterial strain able to grow and then degrade the organic polymers. In addition to using a water-spraying system to obtain certain water content in soil, the water-spraying system can be combined with the nitrogen source and inorganic nutrient salt supply device 102. In other words, the nitrogen source and the inorganic nutrient salts can be mixed with certain amount of water, and then the mixed solution is delivered to the soil.

Concurrently, the air supply device 104 and the tubing 108 are used to supply air to the soil in the reaction unit 100. In one embodiment, the requirement of air is between 0.5 $m^3$/min and 1.0 $m^3$/min per cubic meter of the soil.

In one embodiment of the invention, for one kilogram of soil that contains organic polymers in the range of 100 mg to 10000 mg, the removal of the organic polymers by the bacterial strain can be as high as 90% to 99% within 30 days to 90 days.

Figure 2:
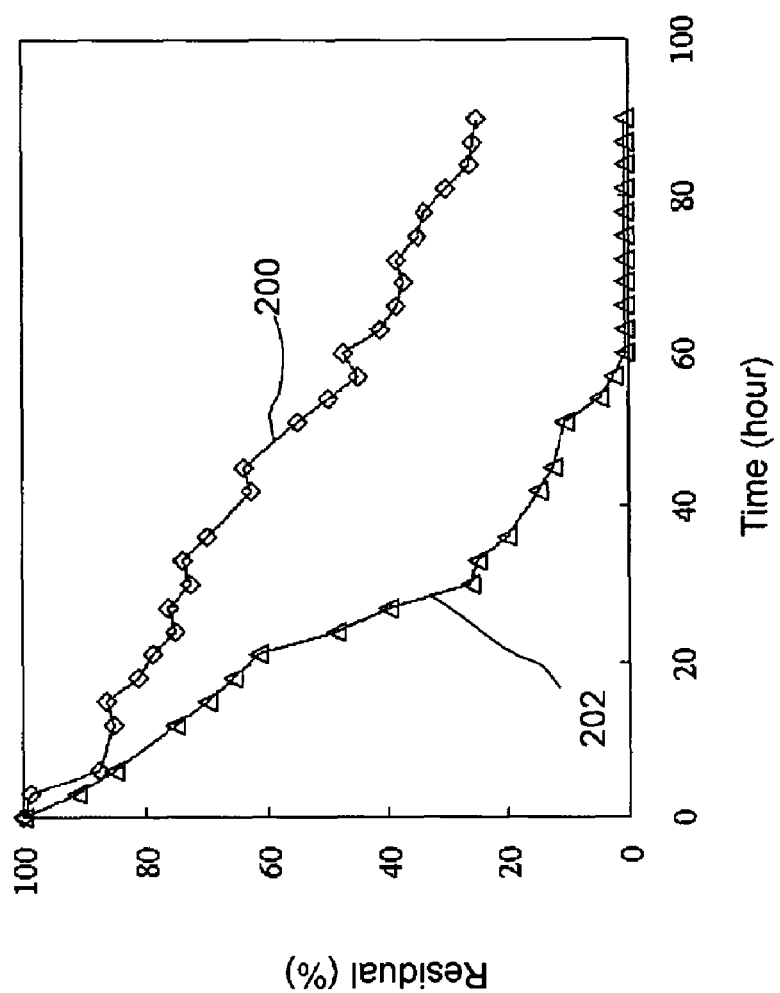
FIG. 2 illustrates the relationship between the amounts of organic polymers degraded by the bacterial strain of the invention and the endogenous bacteria in soil with the increase of time.

It is important to note that certain amounts of endogenous bacteria in the soil can adversely affect the viability of *P. nitroreducens* TX1. However, after an actual operation, the viability of *P. nitroreducens* TX1 of the invention was not affected by the endogenous bacteria and can maintain its capability in the degradation of organic polymers. In one embodiment of the invention, the amount of organic polymers degraded by *P. nitroreducens* TX1 and the endogenous bacteria in the soil as a function of time is illustrated in FIG. 2. As shown in FIG. 2, curve 200 represents the residual of organic polymer by the endogenous bacteria in the soil with the increase of time, while curve 202 represents the residual of organic polymers by exogenous *P. nitroreducens* TX1 and endogenous bacteria in soil. It is obvious from this embodiment of the invention that the endogenous bacteria in the soil are also capable to degrade organic polymers. However, with the addition of *P. nitroreducens* TX1, the degradation capability is enhanced. In this embodiment, the amount of *P. nitroreducens* TX1 added to the soil is 0.05 to 1.5 times of the amount of the endogenous bacteria. When the amounts of *P. nitroreducens* TX1 added is about 1E8 to 1E 10 per gram of soil.

If the present invention is applied to remove organic polymers in water, the processes are similar to those used in removing organic polymers in soil except the supply of air to the untreated water, which is not essential and is only provided if required. However, the agitation of water is proposed. Since the present invention applied to remove organic polymers in water can preclude the problems of maintaining specific water content and the effect of the endogenous bacteria in soil, the treatment of organic polymers in water is simpler than that in soil.

It is also worth noting that the removal rate of organic polymers in water is higher than that in soil. In one embodiment, when the concentration of organic polymers in water is between 0.01% and 1.0%, the removal rate on the organic polymers by the bacterial strain *P. nitroreducens* TX1 within 1 to 2 days can be as high as 70% to 90%. The amount of organic polymers degraded in water by *P. nitroreducens* TX1 as a function of time in one embodiment of the invention is illustrated in FIG. 3. As shown in FIG. 3, most of the organic polymers in water are degraded within 20 to 40 hours by the method of the present invention.

The method of this invention can be applied to the bioremediation of contaminated soil and water, for example, agricultural soil, industrial wastewater or the treatment of components in an industry process. In addition, this method can also apply to the treatment of organic polymers in a biological treatment process, a physical treatment process and a chemical treatment process of wastewater or sludge.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended here to and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed:

1. A biological method for removing organic polymers, comprising: culturing a bacterial strain *Pseudomonas nitroreducens* ATCC PTA-6168, dispersing the cultured bacterial strain in an environment that contains the organic polymers and supplying a nitrogen source and an inorganic nutrient salt solution to the environment for the bacterial strain to degrade the organic polymers in the environment.

2. The method of claim 1, wherein when the environment is soil, and air is further supplied to the soil.

3. The method of claim 2, wherein an amount of the air supplied to the soil is in a range of 0.5 m$^3$/min to 1.0 m$^3$/min per cubic meter of the soil.

4. The method of claim 2, wherein water content in the soil is maintained at 30% to 60%.

5. The method of claim 2, wherein the soil further contains exogenous bacteria, wherein the amount of the bacterial strain added to the soil is 0.05 to 1.5 times of that of the endogenous bacteria.

6. The method of claim 2, wherein for one kilogram of the soil that comprises 100 mg to 10000 mg of the organic polymer, the bacterial strain is able to remove 90% to 99% of the organic polymer within 30 to 90 days.

7. The method of claim 1, wherein the environment is water, and a concentration of the organic polymer in the water is between 0.01% and 1.0%, and the bacterial strain is able to remove 70% to 90% of the organic polymer within 1 to 2 days.

8. The method of claim 1, wherein the nitrogen source is ammonia or nitrate.

9. The method of claim 1, wherein for one gram of the organic polymer, 0.1 to 0.5 gram of the nitrogen source is required to be added into the system.

10. The method of claim 1, wherein for $10^8$ to $10^{10}$ of the bacterial strain added, 100 to 400 ml of the inorganic nutrient salt solution is added.

11. The method of claim 1, wherein the organic polymer is degraded in the environment which is at a temperature range of 10 degrees Celsius to 40 degrees Celsius.

12. The method of claim 1, wherein the organic polymers are selected from the group consisting of alkylphenol polyethoxylates, dodecyl octaethoxylate, polyethylene glycol, 1,4-dioxand, trioxane and cyclic ether.

13. The method of claim 1, wherein the bacterial strain is cultured in a culture medium comprising alkyphenol polyethoxylates at 15 degrees Celsius to 40 degrees Celsius under aerobic condition with shaking, and a generation time for the bacterial strain is 0.5 hour to 2 hours in the culture medium.

14. The method of claim 1, wherein the organic polymer is in sludge from a wastewater an industrial process.

* * * * *